United States Patent [19]

Moyer, III

[11] Patent Number: 5,032,073
[45] Date of Patent: Jul. 16, 1991

[54] THIN WALLED HIGH VELOCITY PROPAGATION OF FOAMED THERMOPLASTIC RESINS

[75] Inventor: Edwin G. Moyer, III, Terre Hill, Pa.
[73] Assignee: Thermax Wire Corp., Flushing, N.Y.
[21] Appl. No.: 418,334
[22] Filed: Oct. 6, 1989
[51] Int. Cl.⁵ .............................................. B29C 47/64
[52] U.S. Cl. .............................. 425/208; 264/211.21; 366/81
[58] Field of Search .................... 425/204, 208; 264/211.21, 211.23; 366/78, 81, 82

[56] References Cited

U.S. PATENT DOCUMENTS

| | | | |
|---|---|---|---|
| 2,838,794 | 6/1958 | Munger et al. | 366/81 |
| 2,945,265 | 7/1960 | Sell, Jr. et al. | 264/127 X |
| 2,991,508 | 7/1961 | Fields et al. | 264/211.21 |
| 3,873,072 | 3/1975 | Blackmon | 425/208 X |
| 4,082,585 | 4/1978 | Kanotz et al. | 156/51 |
| 4,098,861 | 7/1978 | Bassani | 264/174 |
| 4,150,013 | 4/1979 | Punderson | 526/250 X |
| 4,206,011 | 6/1980 | Kanotz et al. | 156/244.12 X |
| 4,223,811 | 9/1980 | Czegledi | 425/208 X |
| 4,304,713 | 12/1981 | Perelman | 264/45.9 |
| 4,350,653 | 9/1982 | Burnett et al. | 264/127 |
| 4,521,363 | 6/1985 | Vogel | 264/174 |
| 4,609,515 | 9/1986 | Smyth | 264/174 |
| 4,668,173 | 5/1987 | Garner et al. | 425/113 |
| 4,688,411 | 8/1987 | Hagita et al. | 72/42 |
| 4,710,114 | 12/1987 | Garner | 425/110 |
| 4,740,261 | 4/1988 | Moser | 156/244.12 |
| 4,743,480 | 5/1988 | Campbell et al. | 428/422 X |
| 4,770,834 | 9/1988 | Nakasone et al. | 264/127 |
| 4,838,777 | 6/1989 | Weber | 425/114 |

FOREIGN PATENT DOCUMENTS

| | | | |
|---|---|---|---|
| 2117997 | 10/1971 | Fed. Rep. of Germany | 425/208 |
| 2307616 | 9/1974 | Fed. Rep. of Germany | 425/208 |
| 2496002 | 6/1982 | France | 425/208 |

Primary Examiner—Richard L. Chiesa
Attorney, Agent, or Firm—Charles E. Temko

[57] ABSTRACT

An improved extrusion structure and techniques for obtaining very high extrusion speeds based upon the use of higher extrusion temperatures and resulting increase in critical extrusion rates. Structure is provided for eliminating back flow of the extrudate, for continuously mixing the extrudate just prior to entering the extruding die, and for controlling the temperature of the extrudate at critical locations along the path of flow.

3 Claims, 3 Drawing Sheets

THIN WALLED HIGH VELOCITY PROPAGATION OF FOAMED THERMOPLASTIC RESINS

BACKGROUND OF THE INVENTION

This invention relates generally to the field of fabrication of thermoplastic resins, and more particularly to the extrusion of foamed fluorocarbon resins commonly used for providing an insulative covering over conductive wires and cables.

The use of foamed fluorocarbons in the field of electrical insulation is well known, and techniques for extruding such materials at relatively high speeds are widely used in the art. In the field of wire coating, the use of foamed materials has been found particularly advantageous because of the favorable dielectric qualities obtained. This is normally accomplished by passing the conductor or wire to be covered through the extrusion die, with the extrudate from the die flowing about the wire to be formed in situ.

For reasons of economic productivity, it is desirable to extrude in such manner at as high a rate as possible. As disclosed in U.S. Pat. No. 2,991,508, granted July 11, 1961 to R.T. Fields, et al., it is essential that the extrudate have a smooth surface to be commercially acceptable. For most polymers as the rate of extrusion is increased, the outer surface becomes progressively rougher. The point of maximum rate resulting in acceptable smoothness is referred to as the "critical extrusion rate". This rate can be increased by increasing the melt temperature. However, at a certain point the melt viscosity of the extrudate becomes so low that the extruded article will not retain its shape, or the resin itself becomes degraded.

A material commonly used is FEP (Fluoroethylene Polymer), which is a mixture of tetrafluoroethylene polymer and tetrafluoropropylene. As described in the above mentioned patent, it is known to extrude at a rate far above the "critical extrusion rate", at a level known as the "super extrusion shear rate", as well as at reasonable levels above that rate.

Although the super extrusion shear rate is a function of temperature, the "super extrusion flow rate" is not. Rather, it is a function of the temperature of the extrusion die. It is therefore necessary to provide means for controlling the temperature of the extrusion die in order to control the super extrusion shear rate.

The above described process has not been without complications. In order to accomplish sufficient melting, mixing, gas injection, pumping, and mechanically induced shear within the extruder, and to process the FEP foam, the barrel and screw used to flow the extrudate have required considerable modification.

It has been determined that the use of traditional design criteria for the screw extruder has limited the capacity of the extruder both to mechanically flux and pump the compound. In addition, with the use of lower viscosity in the extrudate, there arises a tendency of the material to "backflow" or slip between the surfaces of the screw flights and the inner surface of the barrel of the extruder, with resultant difficulty in maintaining the necessary high delivery pressure on a relatively low viscosity extrudate.

Another problem has emerged in the difficulty in maintaining uniformity in the mass of the melted material. In the case of extrusion about a wire core, the flow of material must change direction through 90° in its path of travel, which tends to affect the homogeneity of the mass of the extrudate.

Still another problem has been the increase in criticality of die temperatures at various points of extrusion and at the point of mixing.

SUMMARY OF THE INVENTION

Briefly stated, the invention contemplates the provision of an improved extrusion apparatus permitting the substantial elimination of the above described problems. To this end, the disclosed embodiment includes improved structure in three critical areas.

A first area lies in the provision of an extruder extension barrel and corresponding screw or torpedo in which the internal diameter of the former and the external diameter of the latter has been substantially increased with respect to the corresponding diameters of the extruder barrel and screw. It is known in the art to provide barrel and screw extensions of the same diameters, for the purpose of effecting superior mixing. However, the result of such structure is often the increase in backflow, often to an extent where very little if any extrudate proceeds to the extrusion die. By forming the barrel extension and that portion of the screw or torpedo disposed therein of increased diameter, additional space for the extrudate is provided, with a lessening of back pressure.

A second area is the provision of a melt flow equalizer. In the process of the compound flowing in a channel which is not symmetrical over the crossection thereof, certain portions of the melt stream have increased velocity relative to other portions which are relatively of decreased velocity. This movement complicates the extrusion of a round and uniform layer over the normally round wire or conductor. In operation, the conductor is pulled through a crosshead, and all points about its circumference move through the crosshead at the same velocity. Because not all of the melt stream is flowing at the same velocity, the volume of molten extrudate which exits the die is not uniform over its crossection. That portion of the extrudate which exhibits the greatest velocity correspondingly exhibits a greater volume flow per unit time; i.e.; the amount of molten compound exiting the round orifice of the die is not uniform.

The effect of any non-uniformity of flow is exaggerated when extruding foamed resins. As the molten extrudate exits the die it begins to expand as the voids, which constitute the foamed resin, begin to form. The expansion rate per unit volume of extrudate is uniform; thereby creating the appearance of a less uniform coating on the wire.

To reduce the effects of the flow differential inside of the wire coating crosshead, a series of channels are created. These channels consist of eight helical grooves cut in a clockwise direction and eight helical grooves cut in a counterclockwise direction on the device which is used to separate the wire from the resin until the 90° directional change in the melt stream has been accomplished. All of these channels are of uniform cross section. Because half of the channels intersect those channels which have been formed in the opposite direction, the melt stream diverges, converges, diverges again and continues this behavior until the melt exits this area of flow interruptions.

These channels act to restrict the flow somewhat due to the increased surface area inside the channeled section. After the melt diverges and flows through a separate channel it converges with another channel. Before the melt diverges again into another channel, the effects of turbulence caused by the two melt streams at the point at which they converge acts to evenly distribute the flow as the melt stream is split again into another pair of separate and distinct channels. The melt stream having been interrupted and combined a sufficient number of times evenly distributes the rate of flow over the cross section; thereby producing an extrudate having uniform velocity over its cross section as it exits the die.

A third aspect of the invention is in the area of focused die temperature control.

In order to overcome severe processing limitations, it has been determined that the application of increased temperatures in certain locations of the extrusion die facilitates increased extrusion rates and improves the quality of the extrudate at these increased rates.

To increase the temperature of the extrusion die without increasing the risk of degrading the compound due to the extrudate being exposed to these elevated temperatures for more than a very brief period of time, a special die configuration and heating device has been developed. The end of the die where the extrudate exits is reduced in diameter for a short length, approximately ½ inch. A housing which is adapted to enclose four high wattage heaters is placed on the end of the die where the diameter has been reduced. This concentrates an extremely high level of watt density on a specific portion of the die where the shear stress on the molten extrudate is greater, that is the land section of the die.

Heaters are also placed on other areas of the die. The watt densities of these heaters is much lower than that which is placed on the die land. Thus, the temperature of these localized areas of the die can be controlled in a manner which is effective in reducing the deleterious affects of excessive shear, while at the same time reducing the risk of excessive exposure of the extrudate to a temperature which will degrade and destroy the compound.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 14:
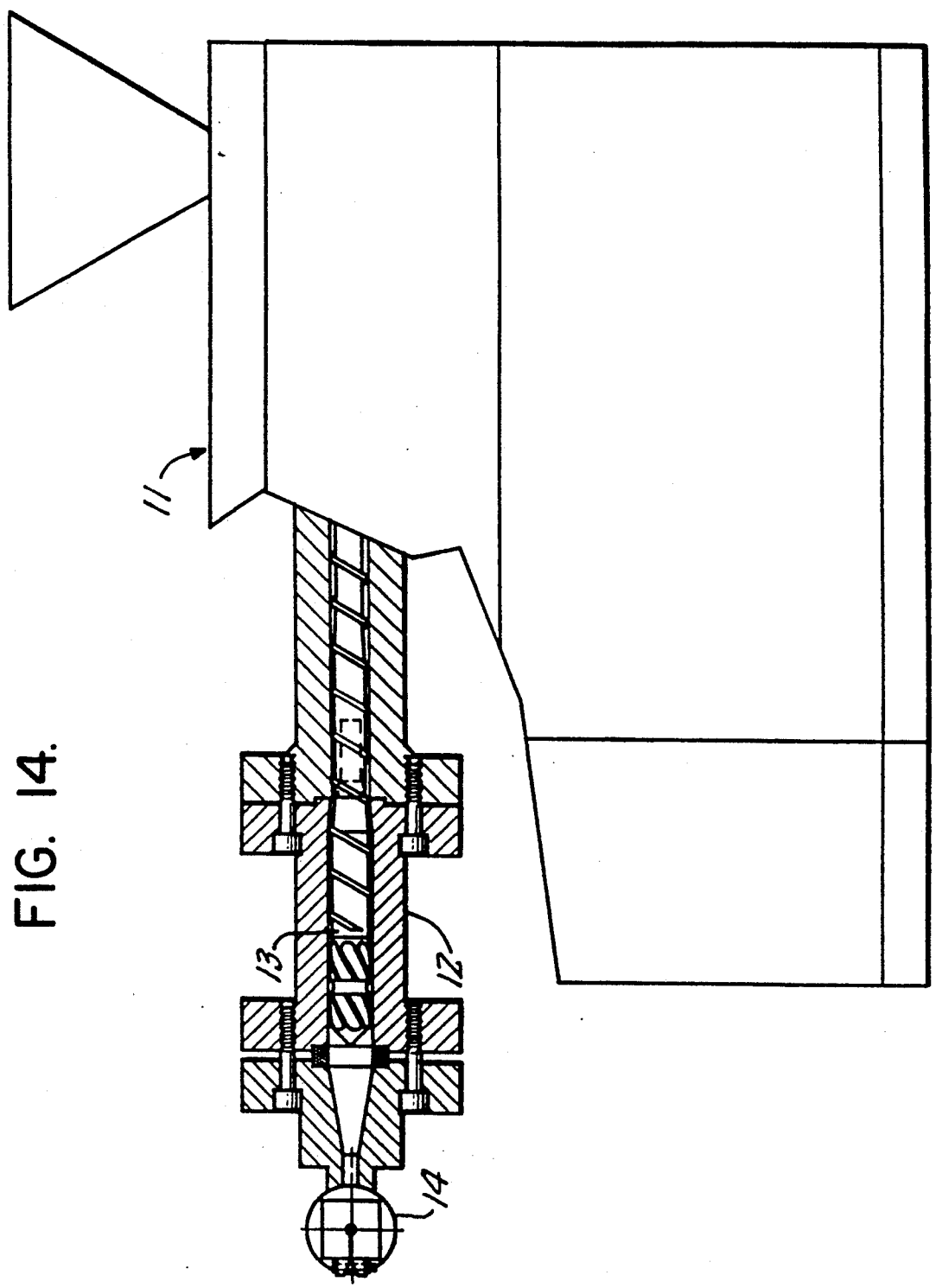
FIG. 14 is a view in elevation, partly in section, of a conventional extruder embodying the invention.

In accordance with the invention, the device, generally indicated by reference character 10 is used in connection with a conventional thermoplastic extruder 11 (FIG. 14). It includes a barrel extension 12 and a foam screw extension 13 which feeds a foam crosshead 14 having a core tube 15 positioned therein. The core tube 15 mounts a melt flow equalizer 16 positioned adjacent an extrusion die 17, the die having first and second heating elements 18 and 19, respectively.

Figure 1:
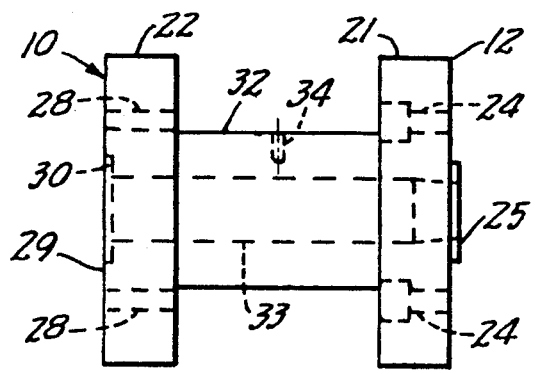
FIG. 1 is a side elevational view of an extrusion barrel extension, comprising a part of the disclosed embodiment.
Figure 2:
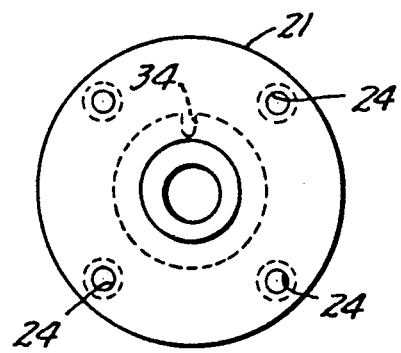
FIG. 2 is an end elevational view thereof as seen from the left hand portion of FIG. 1.
Figure 3:
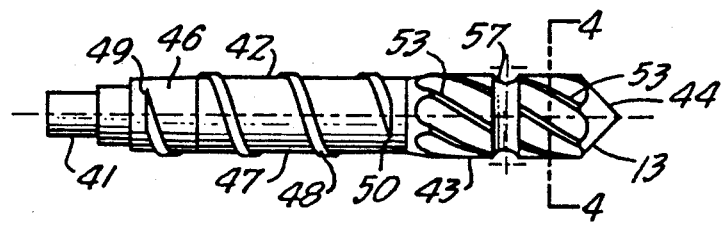
FIG. 3 is a side elevational view of a screw element forming another part of the embodiment.
Figure 4:
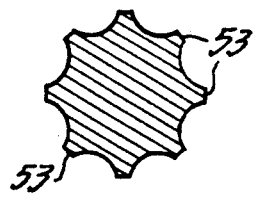
FIG. 4 is a transverse sectional view as seen from the plane 4—4 in FIG. 3.
Figure 5:
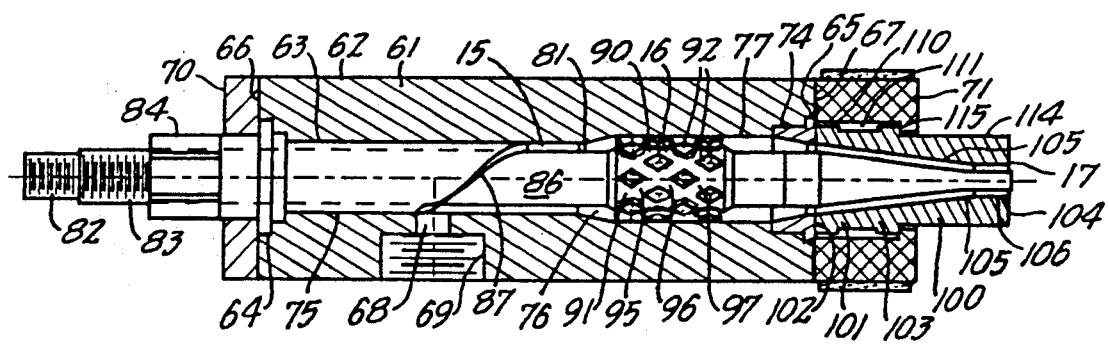
FIG. 5 is a longitudinal central sectional view of a crosshead, employed for the introduction of a wire core into the extrudate to form a completed article.
Figure 6:
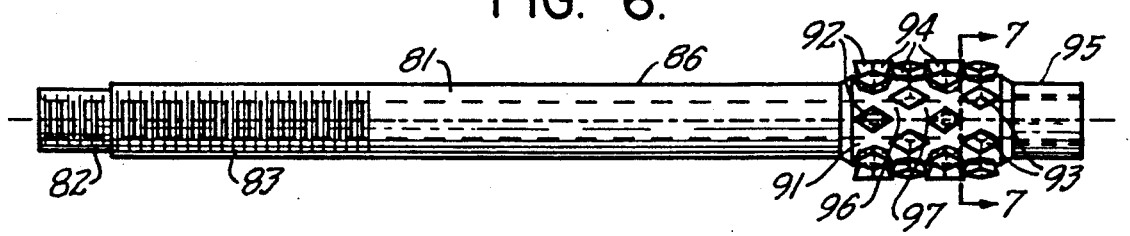
FIG. 6 is a longitudinal elevational view of a core tube element with an integral flow equalizer.
Figure 7:
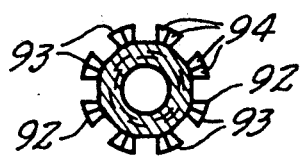
FIG. 7 is a transverse sectional view as seen from the plane 7-7 in FIG. 6.
Figure 8:
FIG. 8 is an enlarged elevational view of an individual channel-forming member.
Figure 9:
FIG. 9 is a top plan view of channel-forming member.
Figure 10:
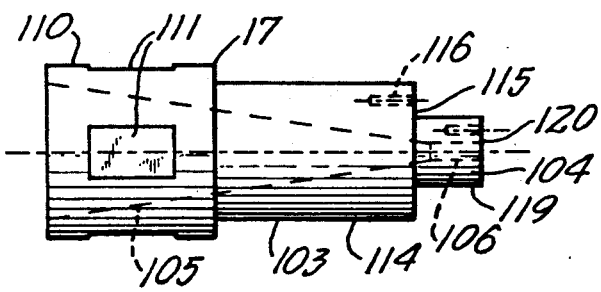
FIG. 10 is a schematic side elevational view of a die element.
Figure 11:
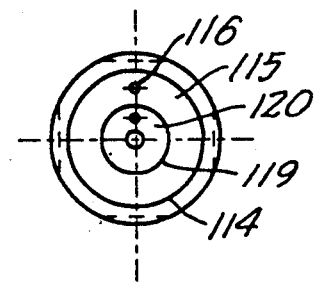
FIG. 11 is an end elevational view of the die element as seen from the right hand portion of FIG. 10.
Figure 12:
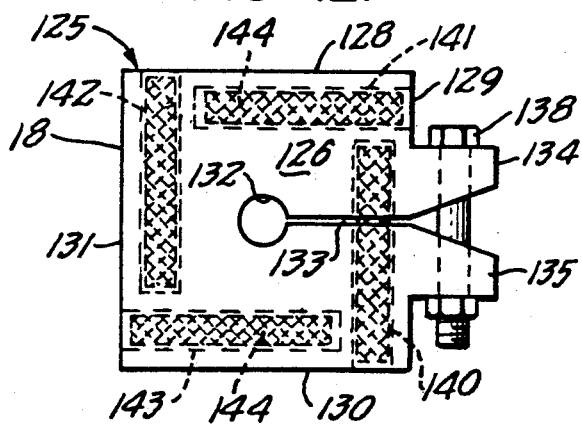
FIG. 12 is an enlarged end elevational view of a heater housing positioned adjacent the die element during operation.
Figure 13:
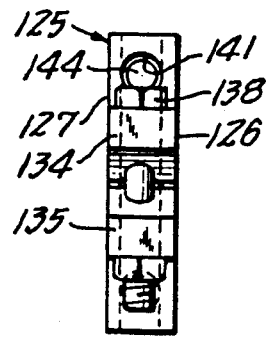
FIG. 13 is a side elevational view thereof as seen from the right hand portion of FIG. 12.

The barrel extension 12 is of generally known configuration, and is characterized in having an internal longitudinal bore the diameter of which varies from 1.1 to 1.375 times the diameter of the barrel of the extruder with which it communicates. As shown in FIG. 1, it is approximately 7½ inches in length. It includes a first mounting flange 21 secured to the extruder, and a second mounting flange 22 which engages the crosshead. For this purpose, the flange 21 is provided with four counterbored holes 24 and an annular projection 25. The flange 22 is provided with four bores 28 at an outer surface 29 having a recess 30 normally engaged by a packing seal (not shown). The barrel 20 is bounded by an outer surface 32 and has a longitudinal bore 33 which communicates with a radially extending bore 34 through which freon foaming material is injected for mixing.

The screw extension 13 is of corresponding length, and generally known configuration. Like the barrel extension 12 in which it is disposed, it is of enlarged diameter relative to the diameter of the screw of the extruder (not shown). It includes a driving hub 41, a driving section 42, a mixing section 43 and a forward nose section 44. The driving hub includes a conical feed portion 46, and a cylindrical portion 47 having a continuous helix 48 of radius approximating 1/16 inch, extending from an inner terminal 49 to an outer terminal 50.

The mixing section 43 includes eight helical flutes 53 normally disposed at a 60° angle with respect to the longitudinal axis of the body of the extension 13 which are of generally conventional configuration. The flutes have a radius of approximately 0.25 inches, and are separated by a medially disposed radially oriented mixing groove 57, the details of which are well known in the art. Like the bore in the barrel extension 12, the diameter of the flutes is greater to accommodate the increased diameter of the extension into which it is positioned. The net result is a slight increase in the volume of the interstice therebetween, which serves to significantly reduce back pressure and facilitate its flow of the extrudate therethrough.

The crosshead 14 is of known type, and is used to conduct the wire or conductor through the extrusion die so that the extrudate may be extruded on the outer surfaces thereof. It includes a main cylindrical body 61 bounded by an outer surface 62 and having a longitudinal bore 63 communicating with first and second counterbores 64 and 65 at end surfaces 66 and 67. Radially extending bore 68 and threaded counterbore 69 communicate with the barrel extension 12 in a known manner.

Overlying the surfaces 66 and 67 are a backing plate 70 and a face plate 71, the latter including first and second bores 72 and 73 enclosing a wedge ring 74 forming part of the die 17. The bore 63 includes a first section 75, a conical connecting section 76 and a second section 77 adjacent the wedge ring 74.

The core tube 15 is fixedly mounted within the crosshead, and includes a cylindrical body 81 having a threaded end 82, and a threaded section 83 mounting an adjusting nut 84 which cooperates with a positioning member 85 in the backing plate 70. A smooth outer surface 86 mounts a helicoid 87 which serves to conduct material through the crosshead to the flow equalizer 16.

The flow equalizer 16 includes an enlarged cylindrical section 90 having an outer surface 91 mounting a plurality of five-sided projections 92, each including an outer surface 93 and four side surfaces 94. The projections are generally trapezoidal in configuration, and are formed in the course of forming a channel network 95 which includes eight clockwise channels 96 which intersect eight counterclockwise channels 97. During operation, the intersecting channels 96 and 97 continuously form streams of at least partially mixed exudate, which streams separate and recombine as they move from clockwise channels to counterclockwise channels and back again. Thus, by the time the exudate passes the equalizer, the material is thoroughly mixed and of generally homogeneous consistency.

The extrusion die 17, except as indicated, is generally conventional. It is formed of materials capable of withstanding high temperatures without distortion, which are well known in the art. It includes a unitary body 100 having a rear section 101 bounded by an end wall 102 which mates with the wedge ring 74. A medially positioned section 103 communicates with an outer terminal section 104. The former includes a conical bore 105, and the latter a cylindrical bore 106 which forms the land of the die, that is to say the surface which shapes the cross-section of the exudate.

The rear section 101 includes an outer surface 110 having optional machined rectangular flats 111 to facilitate tool engagement for purposes of disassembly. The medial section 103 is bounded by an outer cylindrical surface 114 and an end surface 115 in which a T/C port 116 is provided. The outer terminal section 104 is bounded by a cylindrical surface 119 and an end surface 120.

The first heating element 18 includes a rectangular housing 125 bounded by first and second planar surfaces 126 and 127, and four side surfaces, 128, 129, 130 and 131. A centrally disposed bore 132 extends between the planar surfaces 126 and 127, the bore communicating with a radial planar slot 133, the plane of which extends between a pair of aligned flanges 134 and 135. This construction enables the housing 18 to be slipped over the surface 104 and clamped by nut and bolt means 138. Four elongated bores 140, 141, 142 and 143 are mutually angularly arranged, and enclose electrical heating elements 144 of known type, the temperature of which is critically controlled by means (not shown).

A standard appropriately sized cylindrical mica band heater 19 is engaged with the outer surface of cylinder 114.

During operation, the device functions in a manner known in the art. However, because of the increased diameter of the barrel extension 12 with respect to the barrel on the extruder, and a corresponding increase in diameter of the screw extension 13, flow of extrudate is materially increased without adding to back pressure, and without requiring substantial increases in power. The freon gas which is introduced into the mixture to cause foaming is mixed in normal manner. However, any lack of homogeneity is eliminated as the foamed mixture passes through the equalizer, so that by the time it reaches the die, it is thoroughly mixed and of uniform consistency. When the extrudate reaches the die, additional heat is added to the mass to lower the density and increase the critical shear rate. By the time it reaches the land of the die, the surface of the land, which has been heated to a relatively high temperature momentarily lowers the viscosity of the material as it passes the land, to permit improved smoothness and higher extrusion rate.

Prior to implementing any of the modifications described, many attempts were made in an effort to extrude thin-walled FEP foam dielectric cores. The major problems encountered were related to shear-rate limitations, excessive compound residence time which can lead to degradation, and insufficient mixing of the compound.

In one typical trial, a 0.006 in (0.152 mm) wall of FEP containing 65% voids by volume was to be extruded onto a 26.ga. copper wire. The temperature of the extruder barrel zones were set at typical values for the extrusion of foamed FEP dielectric insulations. These temperatures ranged from 620 degrees Farenheit to 780 degrees F. It was quite evident the extrusion at almost any rate produced an insulation with an unacceptably rough surface. In an attempt to eliminate the roughness, the temperatures of the extruder barrel zones, crosshead, and die were raised. For a brief period of time the roughness disappeared. However, the insulation was oval and the compound began to degrade due to the elevated temperatures.

In addition to the degradation of the compound, the viscosity of the compound was so thoroughly reduced that the pumping efficiency of the extruder screw was reduced. This resulted in a decrease in melt pressure and eventually the portion of the extruder screw where the Freon gas is injected became completely filled with molten compound. At this point no Freon could be injected into the molten resin and the process had to be discontinued.

A number of trials were performed in an attempt to find a set of conditions which would produce desirable and reliable results. It was determined that the use of conventional equipment and technology could not produce FEP foamed dielectric extrusions where the conductor was smaller than 26 ga. and the wall thickness was less than 0.012 inches (0.254 mm) with a void content of 50% or greater.

The following describes several examples where the devices which constitute the claims of this patent were implemented. By sufficient numbers of trials, it was determined that each of the elements alone did not enhance the performance of the process to acceptable standards. However, these elements in combination acted to correct the problems associated with this extrusion process and were found to have a wide range of applicability.

EXAMPLE 1

The foamed dielectric product which was produced in this trial consisted of the following materials and conformed to the following desired attributes.
a) FEP fluorocarbon resin (DuPont Polymer Products) was used, specifically for its inherently low dielectric constant of 2.01 to 2.02.
b) Freon 22 (chloro-difluoromethane) under pressure and in the gaseous state was used for void formation.
c) silver plated copper conductor, 30AWG (0.0101 in., 0.257 mm diameter) was used as the center conductor in this trial.
d) A concentrate consisting of the FEP fluorocarbon resin containing approximately 5% by wt. of finely divided boron nitride powder. This concentrate is typically used in the production of FEP foamed dielectric insulations.
e) A final diameter of 0.029 inches (0.737 mm), +/−0.002 inches was specified for this construction.
f) A minimum electrical velocity of propagation of 85% was required.
g) Small closed cells of 0.001 inches to 0.003 inches were to be evenly distributed throughout the dielectric insulation covering the center conductor.

The processing conditions which were required to produce an insulated cable conforming to the above specifications were determined over the course of several trial evaluations. The temperatures of the heated zones of the main extruder barrel were set at typical values for FEP foam extrusion. These temperatures ranged from 680 degrees Fahrenheit in the rear of the barrel, where the pellets are introduced to 750 degrees Fahrenheit toward the front of the barrel. This temperature profile resulted in a uniform melting and conveyance of the polymer to the enlarged barrel extension.

The Freon 22 was introduced into the molten polymer in the main extruder barrel in a typical manner for foamed fluorocarbon extrusions. In this particular trial the Freon pressure delivered to the extruder was set at 100 psig and adjusted accordingly after other settings had been made to other controls. A final pressure of 135 psig was found to yield the desired results. An in-line capacitance monitor was used to determine the Freon pressure setting.

The temperature in the enlarged barrel extrusion was found to be critical for conditioning the molten polymer. The temperature of this device was gradually increased until the viscosity of the molten polymer was sufficiently reduced to the point where the extrusion pressure was within a range which produced desirable results. These results were observed to satisfy several requirements:

1) At a given screw speed the delivery pressure would be great enough to prevent premature cell formation either within the extruder barrel or the crosshead. This pressure was found to have a minimum threshold in this trial of 900 psig.
2) At a given screw speed and under other constant conditions the pressure would not be elevated to the point at which the components of the extrusion machine would be in danger of bursting or other resulting damage. In the case of this extrusion machine it was determined that a delivery pressure in excess of 4500 psig would induce excessive wear and tear and may create other dangers.

The temperature of this zone was set at 785 degrees Fahrenheit which allowed for a delivery pressure of 1350 psig at a screw speed of 17 RPM. The temperature setting of this device varied considerably in other trials where other conditions were varied to produce different products.

The reduction of the molten polymer viscosity was monitored as a function of reduced extrusion pressure while maintaining the actual extrudate output as constant. In order to duplicate results from one batch of fluorocarbon resin to another, which may have a different intrinsic viscosity, it becomes necessary to establish certain benchmarks. Extrusion pressure and output were used to establish in-process viscosity approximations which can be used to duplicate production conditions.

The extrusion die and wire guide tip were sized in a manner which would produce the product described above. It was determined that in order to achieve a diameter of 0.029 inches (0.737 mm) over the expanded dielectric extrusion, the diameter of an equivalent mass of extruded non-expanded resin would be 0.0190 inches (0.483 mm). A die with a wire guider tip having an outside diameter of 0.034 inches (0.864 mm).

It was decided that a production rate in excess of 300 feet per minute would demonstrate the commercial feasibility of the device. The resin output, which was maintained at a constant rate while the temperature of the enlarged barrel extension was increased, was arbitrarily set at 4.26 pounds per hour. However, at this extrusion rate the surface of the resulting extrudate was rough, exhibiting melt-fracture. The temperature of the die tip heater was gradually increased until the roughness disappeared. At a rate of 4.26 pounds per hour through an annular opening of 0.049 inches inside diameter and 0.034 inches outside diameter the calculated shear rate is 17,886 reciprocal seconds. The temperature required at the end of the die to sufficiently reduce the molten resin viscosity to the point at which no melt fracture occurred was 840 degrees Fahrenheit.

After having determined that the product was acceptable, minor changes were made in order to stabilize the process. The final extrusion speed was approximately 384 feet per minute. All electrical and dimensional requirements were satisfied and the process remained stable for the duration of the trial.

EXAMPLE 2

FEP fluorocarbon resin (DuPont Polymer Products) was used in this trial also, as was the Freon 22 and fluorocarbon/boron nitride concentrate.

The foamed dielectric product produced in this trial differed in other respects from that produced in Example 1. The results of this trial indicate that the devices and principles employed have a broad range of applicability. The materials used and the electrical and physical requirements of the dielectric core produced in this his example were as follows:
a) Silver plated copper conductor, 33 a. (0.0071 inches, 0.180 mm diameter)
b) FEP fluorocarbon resin
c) Freon 22 gas
d) Nucleating concentrate consisting of boron nitride dispersed in the fluorocarbon resin.
e) A final diameter of 0.031 inches (0.787 mm) over the extruded foamed dielectric insulation.
f) A volumetric void content of 68%.
g) Cell sizes of 0.001 inches to 0.003 inches evenly distributed throughout the insulation.

h) A measured electrical velocity of propagation of at least 85%.

To produce this particular dielectric core a number of process variables were changed. The extrusion die which was used in this example had a land diameter of 0.047 inches (1.194 mm). The diameter of the wire guide tip was 0.0255 inches (0.648 mm).

The extrusion temperatures employed in the main extruder barrel section were similar to those given in Example 1. The temperatures ranged from 680 degrees Fahrenheit to 760 degrees in the main portion of the extruder barrel. The temperature of the expanded barrel extension was elevated to 90 degrees Fahrenheit to condition the molten polymer so as to reduce viscosity without degrading the polymer. At a screw speed of 20 RPM the resultant melt pressure was 1230 psig.

To achieve a level of 68% voids in this example, the Freon pressure was increased to 165 psig. This increased the extrudate delivery pressure threshold to 1050 psig to prevent premature cell formation. A delivery pressure of 1230 psig was used in this case to establish the required reduction of resin viscosity, while maintaining output as constant. In this case the resin output was maintained at 5.6 pounds per hour. At this volume output the shear rate for the particular die and wire guider tip used was 13,113 reciprocal seconds. At this shear rate melt fracture of the molten resin exiting the die was quite evident. The temperature of the die was slowly increased until the melt fracture disappeared. The final temperature of the die tip that eliminated the rough texture was 810 degrees. The line speed which produced the desired results was 442 feet per minute. The extrusion process was continued for a period of three (3) hours in order to determine the stability under these conditions. A minor adjustment of the Freon pressure and the line speed were required after a period of about 45 minutes. All of the cable core produced in this trial conformed to the dimensional requirements. The measured electrical velocity of propagation was approximately 91%.

I wish it to be understood that I do not consider the invention to be limited to the precise details of structure shown and set forth in this specification, for obvious modifications will occur to those skilled in the art to which the invention pertains.

I claim:

1. A thermoplastic resin extruder comprising a melt flow equalizer, said extruder including a hollow barrel having a longitudinal bore, a rotating screw extension positioned within said bore, a relatively fixed core tube disposed within said bore having an outer diameter less than that of said longitudinal bore to form a longitudinally extending interstice therebetween; said flow equalizer comprising a helicoid portion upstream of a plurality of generally trapezoidally-shaped projections on said outer surface of said core tube, said projections forming a plurality of intersecting channels disposed at an angle with respect to the axis of said longitudinal bore; whereby extrudate passing through said interstice is divided into plural flow streams which continuously intersect to separate and reintegrate, thereby continuously mixing the extrudate as it passes through said flow equalizer.

2. A melt flow equalizer in accordance with claim 1, wherein it is located at a point along said longitudinal bore adjacent an exit end thereof, said extruder having an extrusion die located at said exit end.

3. A melt flow equalizer in accordance with claim 2, wherein said projections forming channels disposed at approximately 60° with respect to the axis of said longitudinal bore.

* * * * *